May 30, 1933.                S. RUBEN                1,912,223
ELECTRIC CONDENSER
Filed May 15, 1928
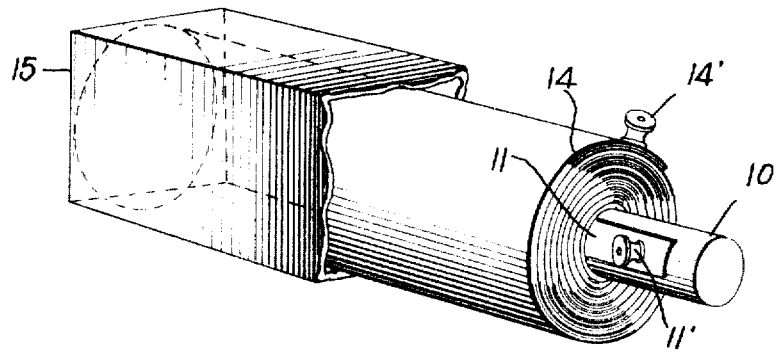
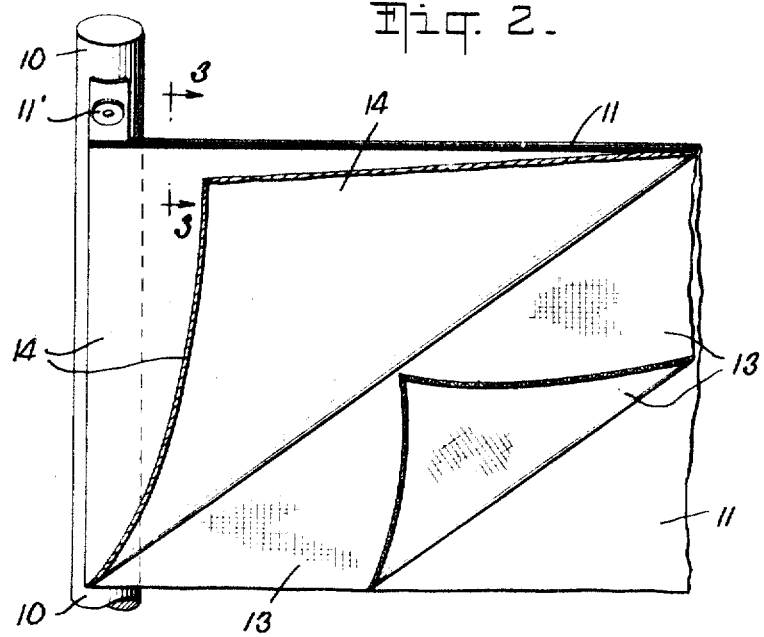
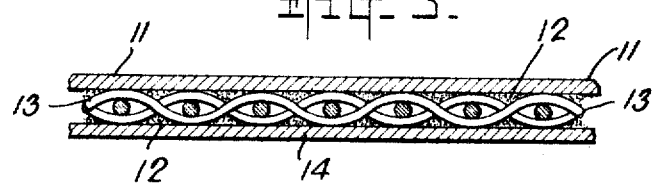
INVENTOR.
Samuel Ruben
BY
Mayer, Warfield & Watson
ATTORNEYS.

Patented May 30, 1933

1,912,223

UNITED STATES PATENT OFFICE

SAMUEL RUBEN, OF NEW YORK, N. Y., ASSIGNOR, BY MESNE ASSIGNMENTS, TO RUBEN CONDENSER COMPANY, OF NEW ROCHELLE, NEW YORK, A CORPORATION OF DELAWARE

ELECTRIC CONDENSER

Application filed May 15, 1928. Serial No. 277,827.

This invention relates to electric condensers, and more particularly to electric condensers which employ electrolytic material between the plates and depend upon the film-forming properties of the plate-electrodes with respect to such material, to provide a dielectric layer on their active surfaces.

The object of the invention is generally to provide a condenser of the character described which is efficient, economical and readily manufactured.

More specifically, an object of the invention is to provide an improved condenser of the electrolytic variety, which shall be dry and have the property of automatically renewing the dielectric layer or film under service conditions whenever required, and which has not only high dielectric strength, but also relatively high capacitance per unit of volume.

It is also an object to provide a condenser in which the leakage and other losses are substantially reduced.

This application is a continuation in part of my copending applications, Serial Nos. 742,787, filed October 10, 1924; now Patent No. 1,715,789; 63,203, filed October 19, 1925, now Patent No. 1,774,455; and 199,861, filed June 18, 1927.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention reference should be had to the following detailed description taken in connection with the accompanying drawing, in which:

Fig. 1 shows in perspective a condenser constructed to have the form of the so-called "roll type", and embodying the present invention;

Fig. 2 is a fragmentary view showing in unrolled form the electrode or plate elements of the condenser shown in Fig. 1; and Fig. 3 is an enlarged fragmentary view showing a cross-section taken on the line 3—3 in Fig. 2.

Referring now to the drawing, a condenser of the roll-type, as shown in Fig. 1, is made by winding plate elements 11 and 14 in sheet form about a winding mandrel 10, which mandrel remains a part of the assembled condenser.

The plate elements here employed comprise opposed electrodes of metal of a character adapted to have films formed on their opposed active surfaces, which films have dielectric properties and are formed by an electrochemical reaction with a layer of film-forming material 12 interposed between the plate elements. Relatively highly electro-positive metals are suitable materials from which to construct the plate elements. The suitable metals for this purpose are the lighter metals of the second and third groups in the periodic table of chemical elements, for example, calcium, magnesium, aluminum and zinc. From the standpoint of both durability and cheapness aluminum is preferred.

In constructing a wound condenser, as shown in Fig. 1, a plate electrode 11 is disposed to have one edge lying longitudinally along the mandrel 10. This plate electrode is preferably provided with a terminal connection projecting therefrom as indicated at 11'. The surface of the plate is then covered with the film-forming material which is an electrolyte and adapted to react in the solid state with the surface of the plate-electrode to form a dielectric film without the aid of free moisture. In order to conserve space, it is desirable that the film-forming material should be distributed over the plate surface in a thin and even manner and should, as far as possible, be arranged so as not to break up and form lumps when the condenser is rolled upon the mandrel. Mechanically, this may be well accomplished by interposing a supporting agent which is electrically neutral. A piece of relatively fine muslin, such as indicated at 13, is adapted for this purpose, since the recesses in its textile structure may be filled with the film-forming material. This supporting structure is, with advantage initially embedded midway in the film-forming material so that as much of the material is available on one side as the other. The plate structure of an electrolytic condenser, arranged to have interposed film-forming material with a supporting means, is completed by laying upon the first plate electrode, when covered, as described, a second plate electrode 14, which is also provided with a terminal as indicated at 14'.

The plate electrodes 11 and 14 are preferably thin, flexible metal plates, for example .008 inch thick, which can readily be wound, rolled, or otherwise shaped to provide a condenser of desired form and size. The condenser, given its final shape upon the mandrel 10, is preferably inserted in a protecting casing, here shown as 15, partially broken away.

The dielectric film, in accordance with the present invention, should not only have proper dielectric strength, but should be mechanically strong so as not to be readily destroyed. It is also desired, in order that the electrolyte may be substantially dry, that the reaction giving rise to film formation, shall take place without the presence of free moisture. For this purpose it is desired to employ as the active agent in the formation of the film a compound that may be ionized or made to yield reacting components at a relatively low electric potential and shall have a work-function whose value shall be below the critical value of the dielectric strength of the resultant dielectric film that forms upon the plate electrodes. Compounds of the sixth periodic group in the periodic table of chemical elements have this property to a degree, particularly compounds with oxygen.

It has been ascertained that compounds which are relatively rich in oxygen and in which the oxygen is not as retentatively held as in simple oxides are highly suitable for a substantially dry reaction, for example, the complex and oversaturated metallic oxides, such as lead peroxide, vanadium pent-oxide and the magnetic oxide of iron.

The magnetic oxide of iron, however, is preferred, as it has the desired properties in a relatively high degree, particularly when used as the active interposed material for either aluminum or magnesium plate electrodes. This oxide is generally regarded as a mixture of ferrous and ferric oxides molecularly associated in a one-to-one relation. This relation appears to impart to the magnetic oxide, the relatively low retentivity in holding oxygen ions under electric stresses, which is desired as a chief characteristic of the active material employed in accordance with the present invention.

The interposed layer of material may consist purely of the compound selected to yield electrochemically the film-forming radical or component, and may be in crystal form, but it is with advantage mixed with inert binding material. This is particularly true where the active material is the magnetic oxide of iron, since this material has relatively poor adhesive properties.

Suitable neutral binding material for magnetic oxide of iron, that does not inhibit the electrochemical reaction of film formation under electric stress when employed in substantial amounts, are the common compounds of boron, for example, borax and boric acid. The mixing of the binder with magnetic oxide of iron may be facilitated by the admixture of water in the preparatory stages, but where water is used care is exercised to see that substantially all free moisture is out of the interposed layer when the condenser elements are assembled in order to avoid deleterious hydrolytic action.

As an example of a typical composition for the material to be interposed between the plates of a condenser having aluminum electrodes, the following is given:

| | By weight |
|---|---|
| Magnetic oxide of iron | 80% |
| Binder of borax | 20% |
| | 100% |

The proportions given may, of course, be varied within limits. As indicated above, the interposed material may comprise 100% magnetic oxide of iron; the binder, however, may be increased to an amount as great as 30% of the whole mass without affecting adversely the film-forming qualities of the condenser.

When a condenser, constructed in accordance with the present invention, has been assembled, the dielectric is obtained by placing an alternating current of suitable voltage across the condenser terminals so that a forming current may flow until the dielectric film is fully formed on the active surfaces. A condenser of this character, when properly made, has a capacity of from 10 to 15 microfarads per square centimeter of active surface. The dielectric strength of an oxide film in an aluminum plate condenser, appears to be about 12 volts when impressed across the terminals of opposed plates. It has an operating efficiency of 95.5% when the leakage current is about .0008 milliampere per square centimeter.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. An electric condenser comprising plate electrodes of a metal of the lighter elements of the second and third group of the periodic table of chemical elements, and a layer of material including an oxide compound of one of the elements lead, vanadium and iron, and a binding material of a compound of boron interposed between said plate electrodes, adapted in a solid state to react and yield free oxygen components when under electric stress, said components reacting with the active surface of said plate electrodes to provide an oxide dielectric film of a strength sufficient to withstand the working voltage.

2. An electric condenser comprising plate electrodes of a metal of the lighter elements of the second and third group of the periodic table of chemical elements, and a layer of material including oxide compounds of one or more of the elements lead, vanadium and iron interposed between said plate electrodes of a crystalline compound in the solid state and adapted to react and yield oxygen ions when subject to relatively low electric stresses, said components reacting with the active surface of said plate electrodes to provide a self-repairing oxide dielectric film thereover.

3. An electric condenser comprising plate electrodes of a metal of the lighter elements of the second and third group of the periodic table of chemical elements, a layer of material including one or more of the compounds lead peroxide, vanadium pent-oxide, and the magnetic oxide of iron interposed in the solid state between said plate electrodes and yielding oxygen ions adapted to react electrically with the active surface of said plate electrodes to provide an oxide film as a working dielectric, and a reticulated support imbedded in the layer of material.

4. An electric condenser comprising opposed plate electrodes of relatively thin sheet aluminum, and a layer of material interposed between said aluminum plates comprising magnetic oxide of iron; said layer being arranged to react with the active surface of said aluminum plate to form thereon a dielectric film.

5. An electric condenser comprising opposed plate-electrodes of relatively thin sheets of a highly electropositive metal, a layer containing magnetic oxide of iron interposed between said plate-electrodes, and a support for said layer imbedded therein.

6. An electric condenser comprising opposed plate-electrodes of relatively thin sheets of metallic aluminum, a layer containing magnetic oxide of iron interposed between said plate-electrodes, and a support comprising a sheet of neutral material imbedded in said layer and adapted to retain said interposed material in even formation between said plate electrodes.

7. An electric condenser comprising opposed plate-electrodes of sheets of metallic aluminum, a layer of material interposed between said aluminum plates consisting of magnetic oxide of iron and binder, and a support for said layer comprising a reticulated sheet of neutral material imbedded in said layer.

8. An electric condenser comprising a pair of opposed plates of opposite polarity and composed of film-forming compositions, a textural spacer between the plates of the pair and a film-forming electrolyte containing iron oxide suspended within the meshes of said textural material.

In testimony whereof I affix my signature.

SAMUEL RUBEN.

CERTIFICATE OF CORRECTION.

Patent No. 1,912,223.  May 30, 1933.

SAMUEL RUBEN.

It is hereby certified that error appears in the printed specification of the above numbered patent requiring correction as follows: Page 3, lines 30 and 43, claims 2 and 3, respectively, strike out the words "or more"; and that the said Letters Patent should be read with this correction therein that the same may conform to the record of the case in the Patent Office.

Signed and sealed this 26th day of September, A. D. 1933.

(Seal)

F. M. Hopkins
Acting Commissioner of Patents.